May 27, 1924.
J. A. COXE
FISHING REEL
Filed April 5, 1923
1,495,676
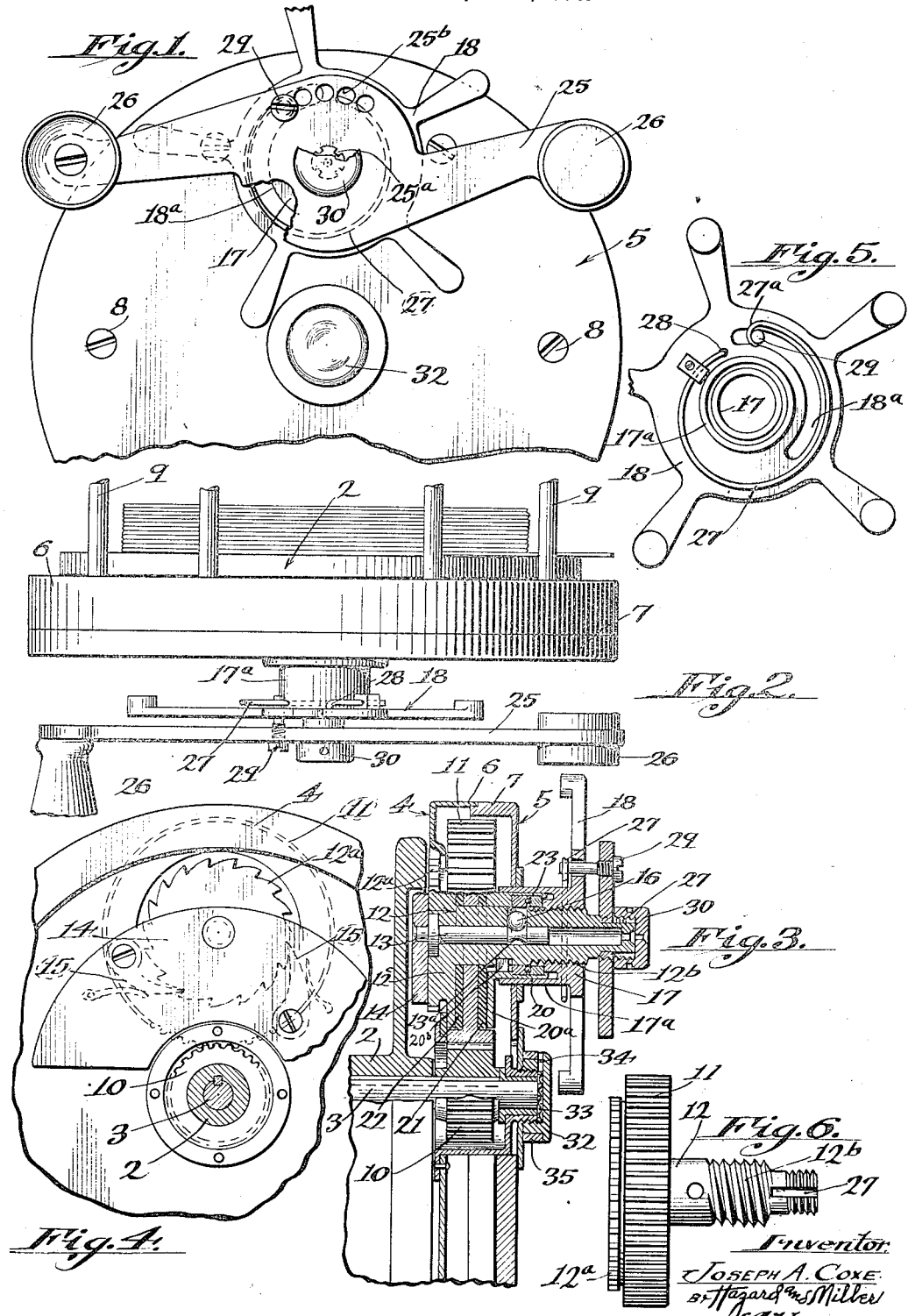

Patented May 27, 1924.

1,495,676

UNITED STATES PATENT OFFICE.

JOSEPH A. COXE, OF LOS ANGELES, CALIFORNIA.

FISHING REEL.

Application filed April 5, 1923. Serial No. 630,033.

*To all whom it may concern:*

Be it known that I, JOSEPH A. COXE, a citizen of the United States, residing at Los Angeles, in the county of Los Angeles and State of California, have invented new and useful Improvements in Fishing Reels, of which the following is a specification.

This invention relates to fish line reels, and more particularly to a type of fish line reel including a reel shaft having a fixed pinion and a manual crank operating a driving gear for driving the reel shaft.

An object of the invention is to provide a triple variation, control means for controlling the action of the driving gear. In other words, it is an object of the present invention to provide a friction control for the driving gear, which is so constructed and operative as to constantly hold the driving gear under a light frictional restraint which is sufficient to prevent the reel to which the line is attached from idling normally, or being wholly free. Further, the frictional control is adapted, under manual action, to fully release the reel for free rotation, and finally, the friction means is adapted to provide for a substantially positive application to the driving gear so that, by the operation of the winding crank, the gear and the reel pinion may be rotated to wind in a fishing line under load, and yet provide for slip of reel.

An object is to provide a friction clutch means combined with the hand crank of the reel and under control of the same.

Another object of the invention is to provide a friction clutch member and a spindle, which parts are associated by a quick pitch thread or threads so that, with a comparatively small, angular movement of the clutch element, it will be brought into its several effective positions, thereby reducing the degree of rotation to a minimum in the application of the clutch member and in its retraction.

Other objects and advantages will be made manifest in the following specification of an embodiment of the invention illustrated in the accompanying drawings, wherein Figure 1 is a side elevation of the reel mechanism, parts of which are broken away for conservation of space.

Fig. 2 is a plan of a portion of the reel mechanism, parts of which are broken away to economize in space.

Fig. 3 is a diagrammatic section of the operating mechanism; parts being in elevation.

Fig. 4 is a side elevation and section.

Fig. 5 is a side elevation of the friction pilot wheel and its associated setting spring.

Fig. 6 is a side elevation of the detached gear spindle and its gear.

The present invention is shown as including a fishing line reel 2, having a shaft 3, on which it is fixed to be rotated therewith. The shaft projects beyond one end of the reel into a gear box consisting of a shallow, circular, inside shell 4 and an outside shallow shell 5, having circumferential meeting flanges, respectively 6 and 7. These shells are fastened together by transverse screws 8; and the box formed of the shells 4—5 is provided with transversely extending, spaced bars 9, for connection with an opposite reel disc not shown.

The projecting end of the reel shaft 3 is provided with a substantial, keyed pinion 10, and this is in constant mesh with a driving gear 11, which is loosely mounted on a hollow spindle 12, which is rotatively supported on a fixed trunnion 13, projecting transversely as to the box 4—5, and being rigidly secured to a plate 14, fixed on the inside shell 4. The plate 14 is mounted in spaced relation to the shell 4, so as to provide a recess for the contiguous head 12$^c$ of the spindle 12, and which head is provided with ratchet teeth 12$^a$, Figure 4, that are engaged by yielding clicks or ratchets 15, which are for the purpose of preventing a reverse rotation of the spindle 12.

The fixed trunnion 13 is provided with a circumferential groove 13$^a$, and in this projects a ball or other device 16, which prevents the spindle 12 from having axial movement of the trunnion. The spindle 12 projects outwardly through the shell member 5 on the gear box and is provided, as shown in Figure 6, with a threaded portion 12$^b$, preferably having a thread or threads of quick pitch. Engaging these threads is a threaded hub 17 of a pilot wheel 18, and this hub has an extended sleeve portion 17$^a$ telescoping over the hub 20 of a friction disc 20$^a$, slidably mounted on the spindle 12.

The pilot wheel 18, when turned in one direction, is caused, by the threads 12$^b$, to move inwardly of the spindle 12 to accomplish a crowding of the clutch disc 20$^a$ against a friction disc 21, which is recessed in one face of the gear 11, whose opposite face is recessed to receive another friction disc 22, bearing against the contiguous face of the spindle head 12$^c$, above referred to.

Preferably, but not necessarily so, there is introduced between and within the hub 20 of the clutch disc 20$^a$ and the hub 17 of the pilot wheel, an end thrust, antifriction bearing 23, so as to eliminate undesirable friction between the clutch disc 20$^a$ and the pilot wheel, and yet provide for the pressure of the clutch disc 20$^a$ against the friction disc 21, so as to obtain a desired frictional cooperation as between the disc 20$^a$ and the gear 11. The clutch disc 20$^a$ is keyed at 20$^b$ to the spindle 12, so as to rotate therewith.

It is a broad object of the present invention to provide means for normally, constantly exerting a torque on the pilot wheel 18 and its hub 17, so as to cause the latter to thrust the clutch disc 20$^a$ against the friction disc 21 and thus exert sufficient pressure upon the web of the gear wheel 11 to restrain the same—in other words, it is desirable to maintain practically constantly, a frictional drag of the gear wheel 11. Means are provided to accomplish this constant frictional drag, and such means are of such character as to be thrown substantially instantly into ineffective condition, so as to provide what is known to fishing sportsmen as a "free spool". An important feature of this invention is to provide means becoming effective with a slight movement to provide a free spool or a drag spool as compared with various forms of reel mechanisms now in use, and in which a very considerable movement of the controlling agency is requisite before the desired conditions of drag spool or free spool may be accomplished.

As above stated, the gear wheel 11 is loosely mounted on the spindle 12, and when it is desired to rotate the line reel 2, to draw in the line, a crank device consisting of a lever 25, with a crank knob 26, is rotated. This lever 25 is provided with a hub portion which is detachably but non-rotatively mounted upon the outer end of the spindle 12, and means are provided for making an adjustable connection between the crank lever 25 and the spindle by the setting of the crank lever at different angular positions about the spindle. In the present case, the end of the spindle is provided with a plurality of longitudinal slots 27, and into these are adapted to be slipped inwardly projecting lugs 25$^a$ in the hub proper of the crank lever 25.

Means are provided yieldingly and adjustably connecting the crank 25 and the pilot wheel 18, and such means includes, in the present case, a spiral spring 27, having one end attached as at 28 to the pilot wheel 18, while the opposite end of the spring is provided with a book 27$^a$, and this is engaged by a projection, in the present case in the form of a screw 29, which is selectively mounted in one or another of the plurality of threaded apertures 25$^b$ in the hub of the crank lever 25. The screw 29 has an inwardly projecting shank portion, and this is engaged in the hook 27$^a$ of the spring 27; the pilot wheel 18 being provided with an arcuate slot 18$^a$ through and into which the shank of the screw 29 extends, so that the pilot wheel 18 can be turned forwardly or rearwardly without interference of the pin against or in conformance with the direction of pull of the spring 27.

In the stationary condition of the reel mechanism, it will be seen that the spring 27 is effective to tend to pull the pilot wheel 18 in a contraclockwise direction in Figure 5, which results in the inward movement of the pilot wheel along the threads 12$^b$ of the spindle 12, and therefore causes the clutch discs 21 and 22 to be compressed upon the web of the gear wheel 18 with a suitable and variable degree of pressure, so that when the reel is mounted on a rod and a line is extended out from the reel 2, the line is subject to a slight frictional resistance or drag under the action, and determined by the tension of, the spring 27. If the fisherman is reeling in the line by the rotation of the crank 25, the reel is capable of slipping with respect to the rotating crank upon the exertion of a sufficient tension by the load or fish that may be attached to the line; this slipping permitting the gear 11 to turn between its clutch friction discs 21 and 22 under the pressure of the pinion 10. This provides a desired degree of safety to prevent the line from being snapped, as is the case when the reel 2 is not under a yielding resistance or friction control, and which frequently results, in cases where the frictional control of the reel cannot be instantly reduced so as to release the reel in emergency.

By my invention, it is possible for the fisherman to instantly decrease the frictional drag on the reel 2 by a slight pressure on the pilot wheel 18, to cause the hub of the same to retract, along the screw thread 12$^b$, and release the clutch elements.

If desired, a "free spool" condition of the reel may be instantly obtained by the rotation of the pilot wheel 18 to such a degree as to entirely negative the effect of the spring 27 and fully release the gear wheel 11 from the clutch control, so that the gears and reel can spin without resistance in paying out the line.

In the operation of winding in the line on the reel by the rotation of the crank 25, it will be seen that, since the crank is fixed on the gear spindle 12, it is only necessary to rotate the crank and with this the spindle 12 will rotate and, since the pilot wheel 18 is also mounted on the crank 12, it will rotate with the crank and, during such action, the spring 27 will be effective to constantly maintain a predetermined degree of pressure upon the web of the gear 11 between the friction elements.

In the event of undue wear in the friction elements, it is only necessary to re-set the connecting screw 29 in one of the apertures 25$^b$ provided therefor in the hub of the crank 25, to again take up the lost motion resulting from wear. When the wear has been taken up to the limit of capacity of the adjustment of the screw 29 in the crank lever 25, then a cap nut 30 is unscrewed from the end of the spindle 12 and the crank is re-adjusted in a new angular position on the end of the spindle and the connecting screw 29 is then readjusted in the first of a series of apertures 25$^b$.

For the convenient oiling of the parts, there is mounted outside of the shell section 5, a threaded cap 32, into which the shaft 3 projects. This cap is provided with a fabric or fibrous lubricant wick 33, to be charged with oil through a filling port 34 in the cap 32. The filling port may be covered with a dust guard or ring 35.

Further embodiments, modifications and variations may be resorted to within the principle of the invention.

What is claimed is:

1. A drag and free spool fishing reel mechanism including a reel shaft, a gear for driving the shaft, a spindle in which said gear is loosely mounted, a crank lever for turning the spindle, clutch means for frictionally connecting the shaft and said gear, a pilot wheel on the spindle to open and close the clutch, and a tensioned connection between said wheel and the crank.

2. A drag and free spool fishing reel mechanism including a reel shaft, a gear for driving the shaft, a spindle in which said gear is loosely mounted, a crank lever for turning the spindle, clutch means for frictionally connecting the shaft and said gear, a pilot wheel on the spindle to open and close the clutch, and means connecting the said wheel and said crank and normally creating a drag of the clutch means on the gear, said connecting means including a spring attached to the wheel and to the crank.

3. A drag and free spool fishing reel mechanism including a reel shaft, a gear for driving the shaft, a spindle in which said gear is loosely mounted, a crank lever for turning the spindle, clutch means for frictionally connecting the shaft and said gear, a pilot wheel on the spindle to open and close the clutch, and means connecting the said wheel and said crank and normally creating a drag of the clutch means on the gear, said connecting means including a spring attached to the wheel and adjustably attached to the crank.

4. A drag and free spool fishing reel mechanism including a reel shaft, a gear for driving the shaft, a spindle in which said gear is loosely mounted, a crank lever for turning the spindle, clutch means for frictionally connecting the shaft and said gear, a pilot wheel on the spindle to open and close the clutch, and means connecting the said wheel and said crank and normally creating a drag of the clutch means on the gear, said connecting means including a spring attached to the wheel and to the crank, said wheel being slotted to clear the spring attaching means.

In testimony whereof I have signed my name to this specification.

J. A. COXE.